UNITED STATES PATENT OFFICE.

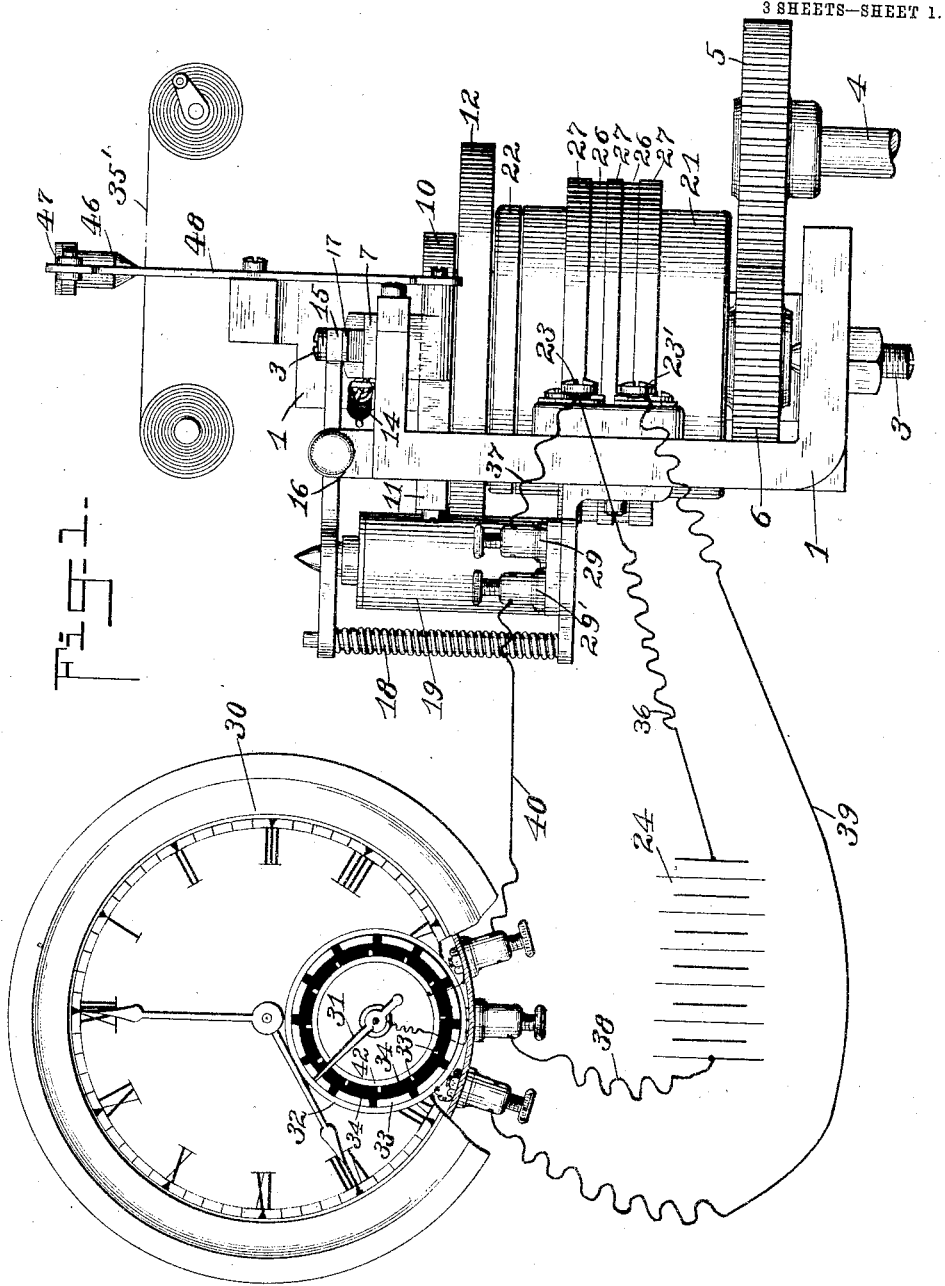

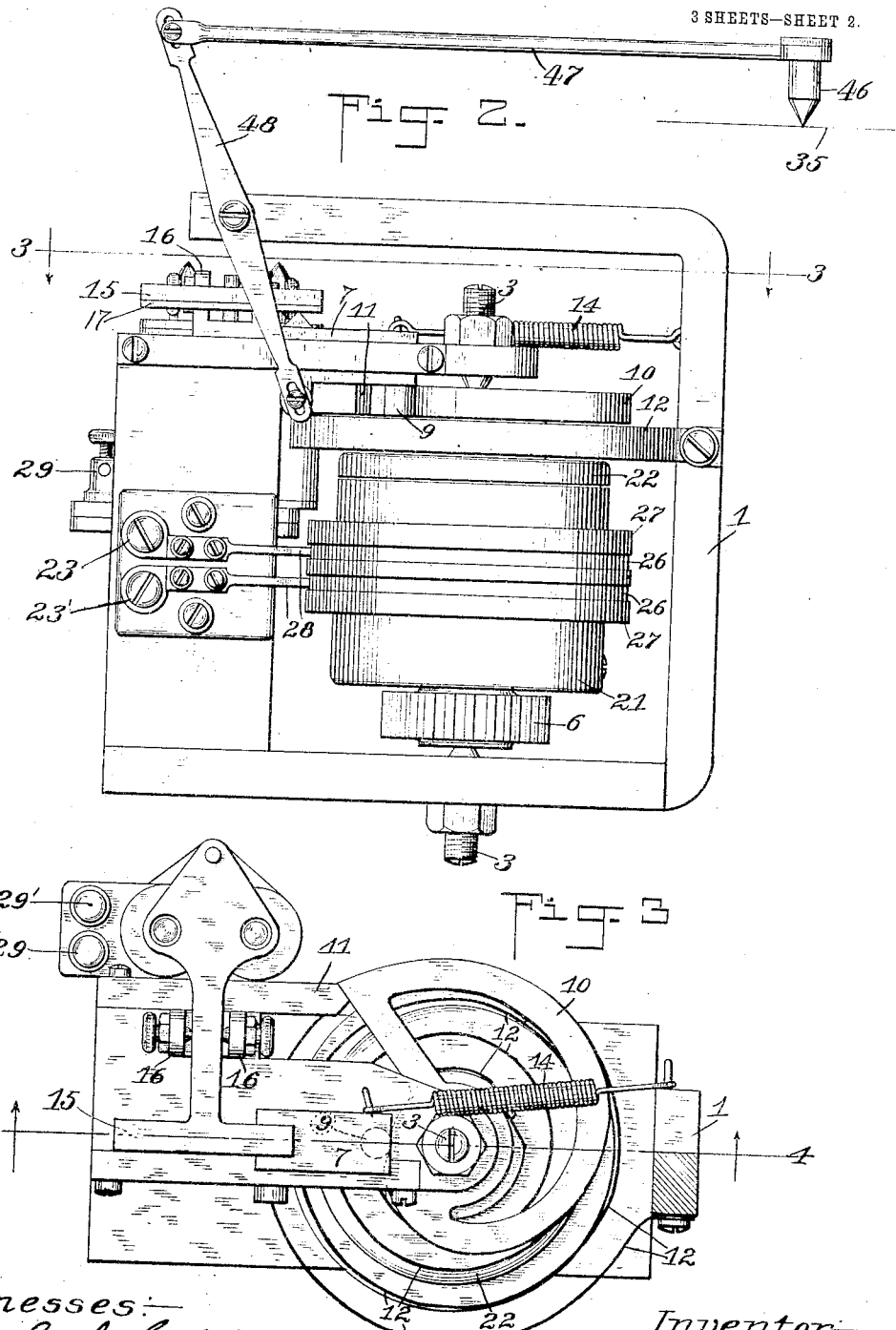

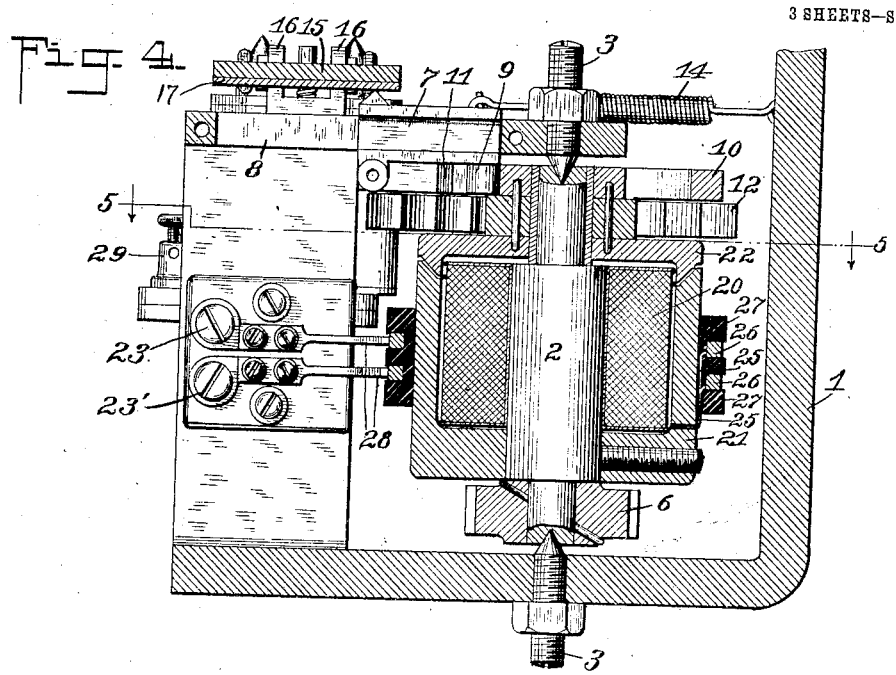
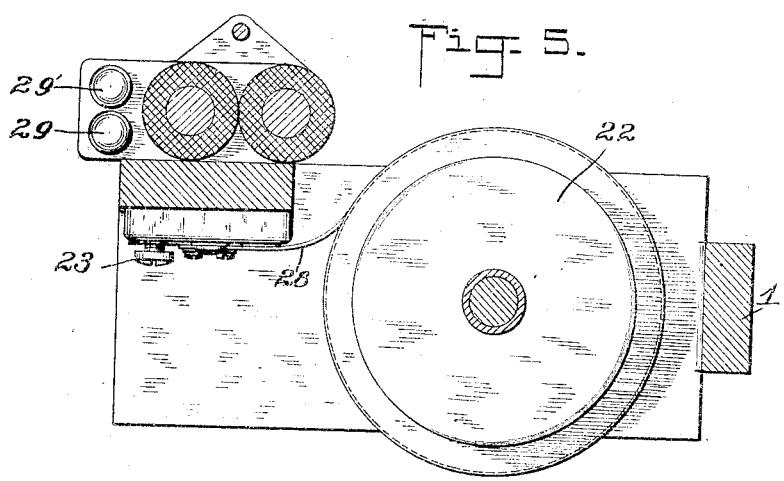

WILLIAM N. MITCHELL, OF CHICAGO, ILLINOIS, ASSIGNOR TO THE INTERNATIONAL TEXT BOOK COMPANY, OF SCRANTON, PENNSYLVANIA, A CORPORATION OF PENNSYLVANIA.

SPEED INDICATOR AND RECORDER.

960,568.

Specification of Letters Patent. Patented June 7, 1910.

Application filed July 25, 1906. Serial No. 327,650.

*To all whom it may concern:*

Be it known that I, WILLIAM N. MITCHELL, a citizen of the United States, and resident of Chicago, county of Cook, and State of Illinois, have invented certain new and useful Improvements in Speed Indicators and Recorders, of which the following is a description.

My invention relates to means for conveniently and continuously indicating the speed of a rotating body.

The object of my invention is to produce a simple, accurate, and thoroughly reliable device of the kind described and one that may be conveniently attached to the running gear of an automobile or railway car to indicate the speed at which the vehicle is moving.

To this end my invention consists in the novel construction, arrangement, and combination of parts herein shown and described and more particularly pointed out in the claims.

In the accompanying drawings wherein like or similar reference characters indicate like or corresponding parts; Figure 1 is an elevation of my device shown operatively connected to a suitable clock mechanism and battery. Fig. 2 is a side elevation of the indicator operating mechanism. Fig. 3 is a section taken substantially on line 3—3 of Fig. 2. Fig. 4 is a section taken substantially on line 4—4 of Fig. 3. Fig. 5 is a section taken substantially on line 5—5 of Fig. 4.

In the preferred form of my device shown in the drawings, 1 is a frame for holding the several parts of my device in operative relation and securing the same in position. A member 2 is rotatably mounted upon the frame 1 by means of the pivot screws, or other suitable bearings 3—3. Any suitable means may be provided for rotatively connecting the member 2 to the object whose speed is to be indicated. As shown a shaft 4 is rotatably connected to the object in any desired manner and provided at its upper end with a gear 5 arranged to mesh with a gear 6 fixedly mounted upon the member 2; the object being to continuously rotate the member 2, while indicating the speed of an object, at a speed bearing a certain known proportion to the speed of the object, so that mechanism may be operated by the member 2 to accurately indicate or record the speed of the object connected therewith.

Any suitable mechanism may be employed adapted to be periodically operated by the member 2 for a fixed interval of time to indicate the extent of the movement of the member 2 during such interval, and if desired by employing sufficiently short intervals in rapid succession to produce practically a continuous speed record of the member 2 and the object to which it is connected. In the form shown, a slide 7 is mounted in suitable ways 8 and provided with a roller 9 or equivalent means arranged to engage the face of a spiral cam 10 rotatably mounted concentrically with, or upon a part of, the member 2, which is shown merely as a small shaft.

A stop 11 is arranged in the path of a portion of the cam 10 and a spring 12 is provided to normally hold the part 10 in a fixed position in contact with the stop. A spring 14 or other suitable means is also provided extending from the slide 7 to a suitable point upon the frame 1 tending to resiliently hold the slide at the inner end of the ways 8 with the roller 9 in contact with the face of the cam 10.

As the cam 10 at the commencement of each interval is in contact with the stop 11, to indicate the extent of its movement during the interval it is only necessary to indicate its position at the close of the interval, and if the indicating device is retained in this position for a short time, say until the commencement of the next interval the difficulties of accurately reading the indications of the device will be greatly reduced.

Any suitable means may be employed to temporarily arrest the return movement of the slide 7. As shown a brake lever 15 is pivotally mounted upon the frame 1 at 16 with a suitably formed part 17 arranged to engage the slide 7 at any point in its travel and arrest its movement, a spring 18 being provided at the opposite end of the part 15 to normally hold the same in engaging position.

Suitable means are provided for releasing the slide 7 when desired. As shown a temporary magnet 19 is provided suitably positioned to attract when energized, a portion of the brake lever 15, compress the spring 18, and release the slide 7.

Any suitable means may be provided to rotatably connect the cam 10 with the member 2. As shown a simple form of electric clutch is provided in which the coils or windings 20 are arranged concentrically about the member 2 as a core and between the central portions of the engaging or clutch members 21 and 22 which are rigidly attached to the member 2 and cam 10 respectively, a friction face being provided upon each of the clutch members adapted to coöperate when the coils 20 are energized to rigidly lock the member 2 and part 10 together.

Suitable binding posts 23, 23' are mounted upon the frame 1 for attaching electrical conductors for energizing the coils 20 and the current may be conducted from the binding posts to the coils by any suitable means. As shown the terminals 25—25 of the coils are attached to the contact rings 26 which are concentrically mounted upon the clutch member 21 and insulated therefrom and from each other by suitable insulating material 27. Brushes 28—28 are provided securely attached to the frame 1 and electrically connected to the binding posts 23 with their free ends pressed firmly against the contact rings 26.

A battery 24 may be connected to my device in any suitable manner. As shown one pole of the battery is connected by a conductor 36 or equivalent means directly to one of the binding posts 23 and from there by means of a conductor 37 to a binding post 29 attached to one terminal of the temporary magnet 19. The opposite pole of the battery is connected by means of a conductor 38 directly to a time switch and from there by the conductors 39 and 40 to binding posts 23' and 29' at the opposite terminals of the coils 20 and magnet 19 respectively.

The time switch may be of any preferred form of construction. In the form shown suitable clock mechanism 30 is provided to rotate an arm 31 which is preferably arranged to make one rotation in a minute and a pair of rings 32 and 42 are rigidly fixed upon the frame of the clock mechanism so that their faces which are each composed alternately of conducting and non-conducting material 33 and 34 respectively are in contact with portions of the arm 31. In the form shown the parts 33 of the outer ring 32 are substantially four times the length of the parts 34 and twelve of each make up the complete ring. In the inner ring 42 which is carefully insulated from the outer the parts 33 are mere points separated by the parts 34 each pair comprising one twelfth the face of the ring. The rings 32, 42 being so positioned that as the arm 31 revolves it momentarily contacts with the part 33 of the inner circle just as it reaches the end of the part 33 of the outer circle.

In the form shown the conductor 38 is connected to the arm 31, the conductor 39 with the ring 32 and the conductor 40 with the ring 42.

It will be observed that when constructed as above described, the electric circuit to the coils 20 will be closed every five seconds and remain closed for an interval of substantially four seconds after which it remains open for one second before it is again closed and that just before the circuit to the coils 20 is broken the circuit to the temporary magnet 19 is closed momentarily. By this arrangement when my device is placed in operation the circuit to the coils 20 is closed and the cam 10 rotated with the member 2 engaging the roller 9 and forcing the slide 7 outward against the resistance of the spring 14 and brake 15, this continues for an interval of nearly four seconds when the brake 15 is released for a moment permitting the slide to adjust itself under the pressure of the spring 14 only, when the brake 15 is again applied and the cam returns to its starting position leaving the slide held by the brake. After the lapse of a second the cam 10 is again engaged and rotated by the member 2 and, in case the speed has increased, operates the same as before after the cam face engages the roller 9, in case however the speed has decreased the cam will not move far enough for its face to engage the roller 9 so that when the brake 15 is released the slide 7 will move inward a distance corresponding to the difference in speed, thus constantly indicating by its position the distance through which the cam 10 rotated when last engaged by the switch.

If desired the ways upon which the slide 7 operates may be graduated and the speed, indicated by the position of the slide, read directly therefrom or an indicating or recording mechanism may be arranged in any desired manner to be operated by the slide. As shown a chart or scale 35 is provided and a pointer 46 attached to the slide 7 by means of a rod 47 and lever 48 is provided to indicate upon the scale the position of the slide. Obviously if a suitable sheet of paper 35' or similar material is substituted for the scale with suitable means to move the sheet, and a pen, pencil or other marking point is employed in place of the pointer 46, the variations in speed will be indicated upon the paper 35' as a permanent record.

In the foregoing specification my device is explained as a device for indicating the speed of a rotating shaft or other object, the principal use however to which it has been applied so far has been to indicate the relative speed of various forms of vehicle wheels, and knowing the diameter of the wheels to record directly upon the sheet 35' the linear speed of the vehicle, and while the preferred form of my improvement is herein shown and described, it is obvious that various slight modifications may be made in my device without departing from the spirit of my invention, hence I do not wish to be understood as limiting myself to the exact form and construction shown.

What I claim as new, and desire to secure by Letters Patent is:—

1. In a device of the kind described, a rotatable member, a rotatable part mounted concentrically with said member, means for rotating said member, a stop positioned in the path of said part, means attached to said part tending to normally hold the same against said stop, in combination with means rigidly mounted upon said member for periodically connecting said part and member for a predetermined interval, a slide arranged to move longitudinally at each rotation of said part, and means arranged to engage said slide tending to prevent its movement but releasing the slide at the completion of each partial rotation of said part.

2. In a device of the kind described, a tatable member, a rotatable part mounted concentrically with said member, means for rotating said member, a stop positioned in the path of said part and means attached to said part tending to normally hold the same against said stop, in combination with means rigidly mounted upon said member for periodically connecting said part and member for a predetermined interval, a slide arranged to move longitudinally a distance corresponding to the arc of rotation of said part, and means arranged to engage said slide to prevent its movement but releasing said slide at the completion of each partial rotation of said part.

3. In a device of the kind described, a rotatable member, a cam concentrically and loosely mounted upon said member, a stop positioned in the path of a portion of said cam, and resilient means tending to normally hold said cam against said stop, in combination with mechanism rigidly mounted upon said member and arranged to periodically connect said cam and member for a predetermined period, a slide adapted to be moved longitudinally by said cam, and a brake arranged to periodically engage said slide and hold the same in position to indicate the extent of movement of said cam during a portion of the next partial rotation of said cam.

4. In a device of the kind described, a rotatable member, a spiral cam mounted loosely and concentrically upon said member, a stop positioned in the path of said cam, means for rotating said member, and resilient means tending to normally hold said cam against said stop, in combination with means for periodically connecting said cam and member for a predetermined interval, a slide adapted by its position to indicate the movement of said cam, resilient means tending to hold said slide in contact with said cam, and a brake arranged to engage said slide and prevent its movement toward said cam until the cam nears the operative limit of its movement.

In testimony whereof, I have hereunto signed my name in the presence of two subscribing witnesses.

WILLIAM N. MITCHELL.

Witnesses:
BURTON U. HILLS,
CHARLES I. COBB.